United States Patent
Dobashi et al.

(10) Patent No.: US 7,948,142 B2
(45) Date of Patent: May 24, 2011

(54) STATOR FOR ROTARY ELECTRIC MACHINE AND METHOD OF MANUFACTURING THE STATOR

(75) Inventors: Masaomi Dobashi, Kariya (JP); Akito Akimoto, Kariya (JP); Yoshinobu Yanagisawa, Toyota (JP)

(73) Assignee: Denso Corporation, Kariya (JP)

( * ) Notice: Subject to any disclaimer, the term of this patent is extended or adjusted under 35 U.S.C. 154(b) by 205 days.

(21) Appl. No.: 12/428,614

(22) Filed: Apr. 23, 2009

(65) Prior Publication Data
US 2009/0273253 A1 Nov. 5, 2009

(30) Foreign Application Priority Data
Apr. 24, 2008 (JP) ................................ 2008-113650

(51) Int. Cl.
*H02K 3/48* (2006.01)
*H02K 15/06* (2006.01)
*H02K 3/46* (2006.01)

(52) U.S. Cl. .......... 310/195; 310/180; 310/208; 29/596; 29/606

(58) Field of Classification Search .................. 310/195, 310/196, 197, 198, 199, 200, 201, 202, 203, 310/204, 205, 206, 207, 208, 209, 180; 29/596, 29/597, 598, 602.1, 603.6, 605, 606; 242/328, 242/365.3, 365.6, 365.8, 366; *H02K 3/46, H02K 3/48, 15/06*
See application file for complete search history.

(56) References Cited

U.S. PATENT DOCUMENTS

| | | | |
|---|---|---|---|
| 6,791,224 B1 * | 9/2004 | Ozawa et al. | 310/208 |
| 6,960,857 B2 * | 11/2005 | Oohashi et al. | 310/198 |
| 7,337,525 B2 * | 3/2008 | Ueda et al. | 29/596 |
| 2003/0127933 A1 * | 7/2003 | Enomoto et al. | 310/208 |
| 2004/0207282 A1 | 10/2004 | Ueda et al. | |
| 2007/0180682 A1 | 8/2007 | Ueda et al. | |
| 2009/0260218 A1 * | 10/2009 | Akimoto et al. | 29/596 |
| 2009/0261685 A1 * | 10/2009 | Akimoto et al. | 310/207 |
| 2010/0000075 A1 * | 1/2010 | Akimoto et al. | 29/596 |
| 2011/0025162 A1 * | 2/2011 | Naganawa et al. | 310/195 |

FOREIGN PATENT DOCUMENTS

| | | |
|---|---|---|
| JP | 08-163838 | 6/1996 |
| JP | 2004-320886 | 11/2004 |

* cited by examiner

*Primary Examiner* — Quyen Leung
*Assistant Examiner* — Michael Andrews
(74) *Attorney, Agent, or Firm* — Nixon & Vanderhye PC

(57) ABSTRACT

A rotor provided in rotary electric machines comprises a stator core having a radial direction and slots provided with bottomed openings directed in the radial direction. The rotor also comprises a stator coil comprising slot accommodation portions being accommodated in the slots of the stator core and coil end portions each connecting mutually adjacent slot accommodation portions among the slot accommodation portions and respectively protruding from both end faces of the stator core. The stator coil is pre-formed into a cylindrical shape before the slot accommodation portions are accommodated into the slots of the stator core. The slot accommodation portions are formed to respectively have convex parts each protruding toward an opposite way to the slot openings, before the slot accommodation portions are accommodated into the slots. The convex parts are pressed by the stator core toward the openings during accommodation of the slot accommodation portions into the slots.

10 Claims, 10 Drawing Sheets

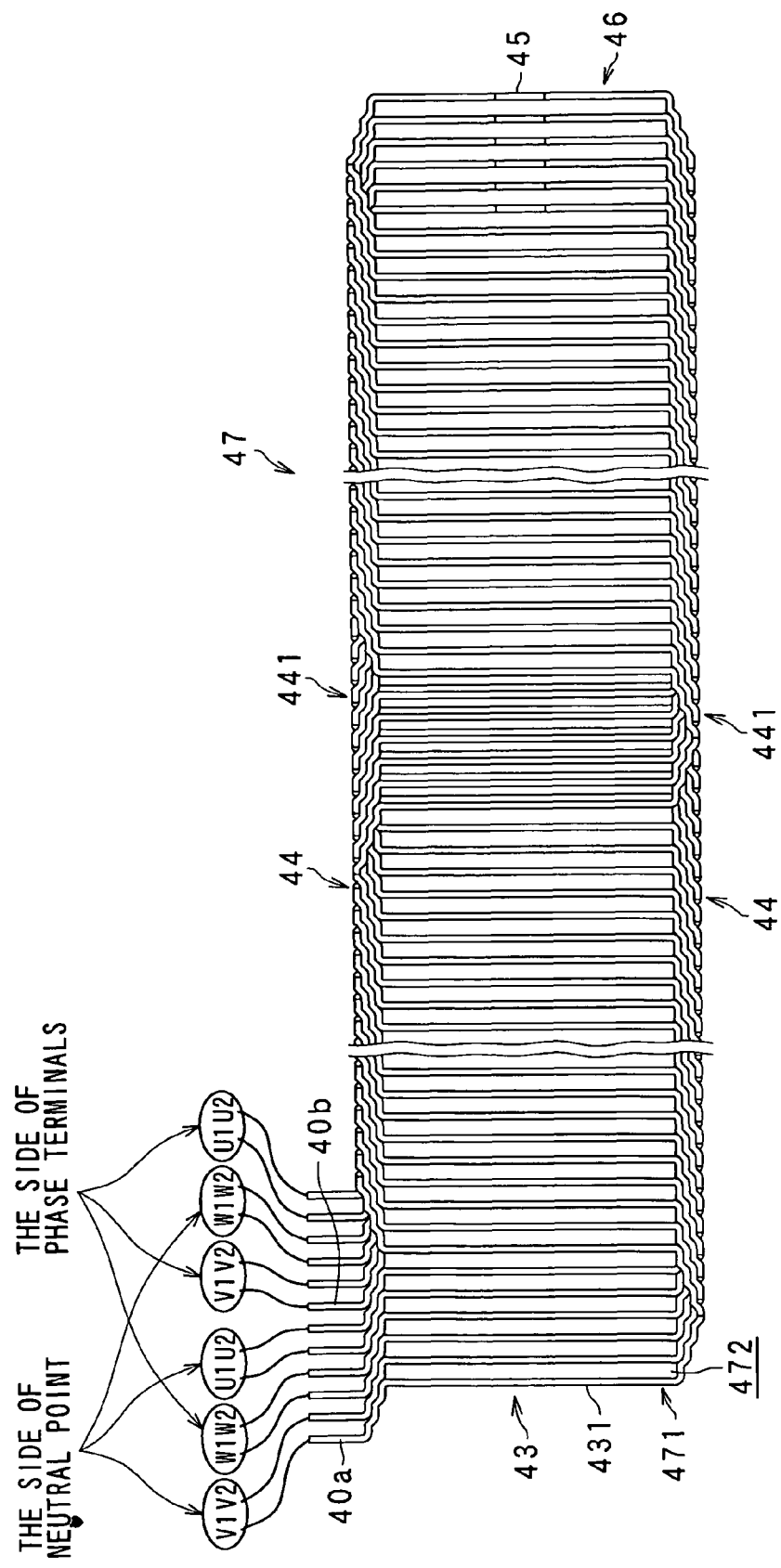

STATOR FOR ROTARY ELECTRIC MACHINE AND METHOD OF MANUFACTURING THE STATOR

CROSS-REFERENCE TO RELATED APPLICATION

This application is based on and claims the benefit of priority from earlier Japanese Patent Application No. 2008-113650 filed on Apr. 24, 2008, the description of which is incorporated herein by reference.

BACKGROUND OF THE INVENTION

1. Technical Field of the Invention

The present invention relates to a stator for rotary electric machines and a method of manufacturing the stator.

2. Related Art

In recent years, rotary electric machines used for electric motors and electric generators are required to be compact in size, to be able to output higher power, and to be of higher quality. In particular, when a rotary electric machine is mounted on a vehicle, the space in which the rotary electric machine is accommodated has become smaller, while it is demanded that the output therefrom is higher. In this circumstance, the conventional rotary electric machine has been provided by the structure for a stator whose stator coil is composed of a continuous winding (for example, refer to Japanese Patent Laid-open Publication No. 2004-320886).

For manufacturing the stator as disclosed by this Publication No. 2004-320886, a belt-shaped formed coil is wound to form a cylindrical stator coil. This cylindrical stator coil is then assembled with a stator core.

As disclosed by this publication, in cases where the stator coil is pre-formed and the stator core is combined (assembled) with the pre-formed stator coil, it is considerably difficult to have, with high precision, the stator coil accommodated in the slots of the stator core. For example, when the stator coil has been assembled with the stator core, the stator coil may protrude, at least partly, from the slots of the stator core in the radial direction of the stator. In general, the stator core faces a rotor with a very narrow gap (clearance). Hence, if the stator coil is left as being protruded, the coil may touch the rotor, whereby there may cause an electric short circuit due to flaking of the coat of the stator coil. It is thus necessary that the stator coil be accommodated in the stator slots without protrusion. For such complete accommodation of the stator coil, many man hours of workers in measurement and confirmation steps may be increased.

In particular, due to the following reason, there is a possibility that the stator coil might partly protrude from the slots of the stator core, when being assembled. In order to form a cylindrical stator coil, the coil wire being used should have a sufficient rigidity which still allows the coil wire to be bendable. For this reason, the coil wire can be bent sufficiently easily. Thus, during steps for forming the cylindrical stator coil, linear portions of a stator coil, which are mounted in the slots of the stator core, may be bent. A probability that the linear portions being mounted are forced to be bent partly or entirely is high. When the stator coil having such bent wire portions is assembled with the stator core, the bent wire portions raise their height in the slots, resulting in the bent wire portions possibly protruding, at least partly, from some slots of the stator.

In addition, after the cylindrical stator coil has been completed, this stator coil is assembled with the stator core. During this assembling step, the stator core inevitably presses the stator coil, resulting in that the stator coil is forced to receive a force directed toward the slot opening of the stator core. This force will cause the stator coil to deform toward the slot opening, which may also lead to a case that the stator coil protrude, at least partly in height, from some of the slots of the stator core.

SUMMARY OF THE INVENTION

The present invention has been made in consideration of the difficulty described above, and an object of the present invention is to provide a stator for rotary electric machines and a method of manufacturing the same, which are able to prevent a pre-formed cylindrical stator coil from the openings of slots of a stator core, when the stator core is assembled with the stator coil.

In order to achieve the above objects, a stator for rotary electric machines according to the present invention comprises a stator core having a radial direction and having slots provided with bottomed openings directed inward or outward in the radial direction; and a stator coil comprising slot accommodation portions being accommodated in the slots of the stator core and coil end portions each connecting mutually adjacent slot accommodation portions among the slot accommodation portions and respectively protruding from both end faces of the stator core. The stator coil is pre-formed into a cylindrical shape before the slot accommodation portions are accommodated into the slots of the stator core, the slot accommodation portions are formed to respectively have convex parts each protruding toward an opposite way to the openings of the slots, before the slot accommodation portions are accommodated into the slots, and the convex parts are pressed by the stator core toward the openings during accommodation of the slot accommodation portions into the slots.

In this stator for rotary electric machines, the slot accommodation portions of the stator coil are given the convex parts, before being accommodated into the slots of the stator core. That is, when the stator coil is solely present as a cylindrical member, the slot accommodation portions are formed to protrude outward in the radial direction, which is the opposite way to the openings of the slots into which the portions are accommodated. In other words, the slot accommodation portions are formed to be concave toward the slot openings. Therefore, when the slot accommodation portions are accommodated in the slots, it is possible to prevent the slot-accommodated portions from protruding, at least partly in height, from the openings of the slots of the stator core.

In forming the stator coil, even if the slot accommodation portions of the stator coil are flexible, the slot-accommodated portions can be prevented from entering the openings of the slots by, at least, a clearance corresponding to the parts which are concave toward the slot openings. With the formed cylindrical stator core, the stator core is assembled, during which time the stator core inevitably presses the slot-accommodated portions of the stator core. Thus the convex parts of the slot-accommodated portions are pressed together by the stator core. However, before being pressed by the stator core, the slot-accommodated portions are concave toward the openings of the slots, so that the pressure on the convex parts can be absorbed by the concave portion. Thus the slot-accommodated portions can be prevented from protruding, at least partly, from the openings of the slots.

In the foregoing configuration of the stator for rotary electric machines, it is preferred that the stator core have an axial direction perpendicular to the radial direction and each of the convex parts is formed as an axial central part of each of the slot accommodation portions, the axial central part protruding more than a remaining part of each slot accommodation portion toward the opposite way to the openings in the radial direction. Both ends of each slot-accommodated portion are integrally formed with coil end portions in the axial direction, respectively. Accordingly the axially central parts of the slot-accommodated portions are easier to deform compared to the axial ends thereof. The easily-deformable axial central parts are protruded more than the remaining parts in the opposite way to the slot openings in the radial direction. It is therefore possible to reliably prevent the slot-accommodated portions from protruding from the slot openings of the stator core.

In the foregoing various configurations, it is preferred that each of the slot accommodation portions have an axial sectional shape of being dogleg, before the slot accommodation portions are accommodated into the slots. Hence, the slot-accommodated portions can be prevented from protruding, at least partly, from the slot openings.

Further, in the foregoing various configurations, it is preferred that each of the slot accommodation portions have connection parts integrally formed with specified coil end portions among the coil end portions, the connection parts having tangent lines which are nearly parallel to the axial direction, before the slot accommodation portions are accommodated into the slots. Since both axial ends of each of the slot-accommodated portions are integrally formed with each of the coil end portions, both axial ends will resist deformation when being pressed by the stator core. Hence, both axial ends of each of the slot-accommodated portions can easily be accommodated into the slots of the stator core.

Further, in the foregoing various configurations, it is preferred that the convex parts be formed by plastic deformation. This plastic deformation gives work hardening to the convex parts. With the aid of this work hardening, the amount of deformation of the slot-accommodated portions toward the slot openings can be limited, even when the convex parts are pressed by the stator core inward in the radial direction. Hence, the slot-accommodated portions can be prevented from protruding, at least partly, from the slot openings, without fail. If the slot-accommodated portions are forced to vibrate during use of the rotary electric machine, the work hardening given to the convex parts can prevent the slot-accommodated portions from falling out of the slot openings.

Meanwhile, in order to achieve the foregoing object, the present invention provides a method of manufacturing a stator for rotary electric machines. When using this method, the stator comprises a stator core having a radial direction and having slots provided with bottomed openings directed inward or outward in the radial direction; and a stator coil comprising slot accommodation portions being accommodated in the slots of the stator core and coil end portions each connecting mutually adjacent slot accommodation portions among the slot accommodation portions and respectively protruding from both end faces of the stator core. The method comprises steps of: forming a plurality of shaped coil members from electric conductive wires; integrating the plurality of shaped coil members into a strip-like integrated body; reeling the integrated body around an outer circumferential surface of a core member to produce the stator coil of a cylindrical form, wherein the slot accommodation portions are formed to respectively have convex parts each protruding toward an opposite way to the openings of the slots before the slot accommodation portions are accommodated into the slots; and assembling the stator core with the stator coil so that the slot accommodation portions of the stator coil are accommodated into the slots of the stator core, wherein the convex parts are pressed by the stator core toward the openings during accommodation of the slot accommodation portions into the slots.

Using this manufacturing method for the stator, the slot-accommodated portions 43 can remain within the slots of the stator core. Besides this, the present manufacturing method can also enjoy the various advantages described above.

BRIEF DESCRIPTION OF THE DRAWINGS

In the accompanying drawings;

FIG. 8 is a plan view showing an integrated body, which is shown as a development view of the stator coil;

DETAILED DESCRIPTION OF THE PREFERRED EMBODIMENTS

Hereinafter, embodiments of the stator for rotary electric machines and the method for manufacturing the stator, which are according to the present embodiment, will now be described with reference to the accompanying drawings.

First Embodiment

Figure 1:
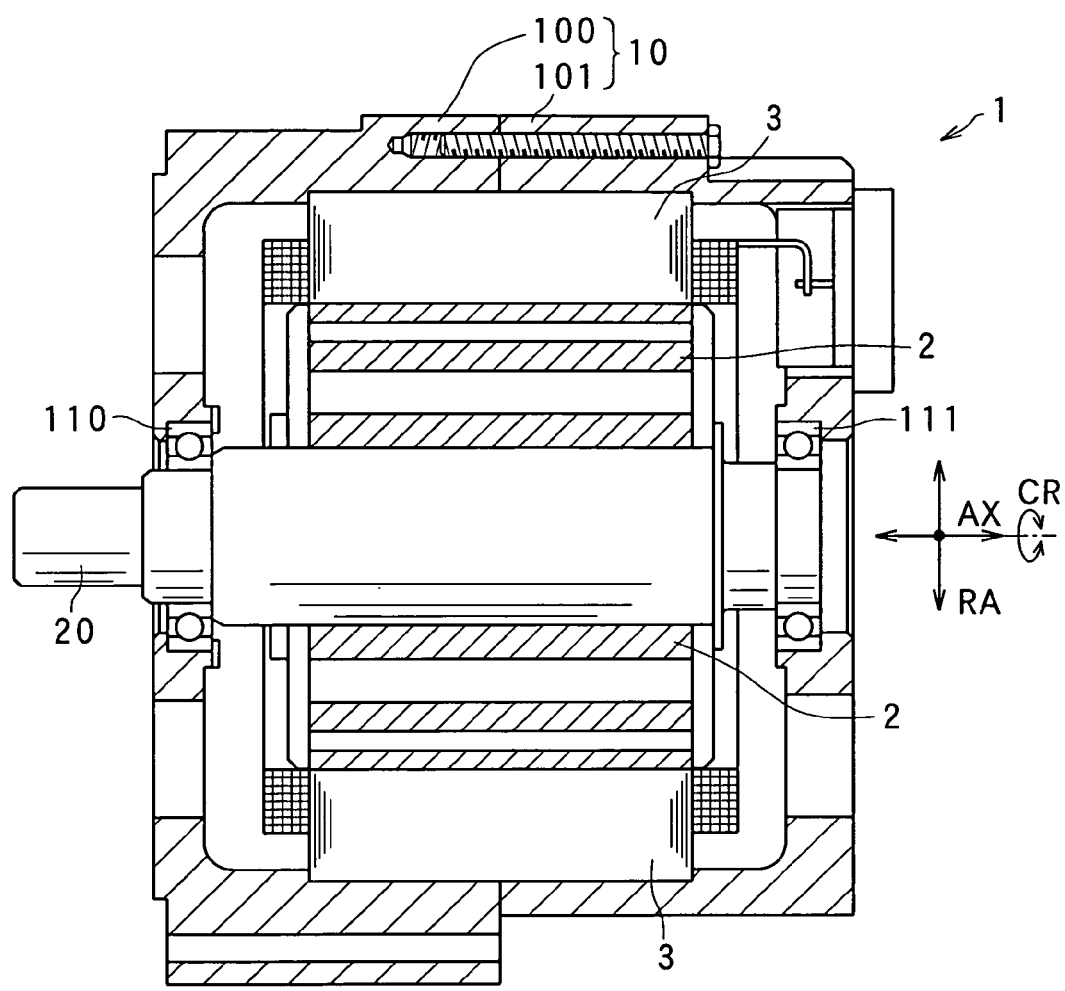
FIG. 1 is an axial sectional view illustrating the configuration of a rotary electric machine according to a first embodiment of the present invention.

First of all, the configuration of a rotary electric machine which uses the stator of the rotary electric machine according to the present embodiment will now be described. As shown in FIG. 1, this electric machine 1 comprises a housing composed of a pair of housing members 100 and 101 each of which is shaped into an approximately cylindrical shape with a bottom and an opening, wherein the respective openings of both housing members being connected to each other, a rotary shaft 20 rotatably supported by bearings 110 and 111 secured to the housing 10, a rotor 2 secured to the rotary shaft 20, and a stator 3 secured to the housing 10 so that the stator is positioned to enclose the rotor 2 within the housing 10.

In the present embodiment, the longitudinal direction of the rotary shaft 20 is defined as an axial direction(s) AX, the directions radially extending from the rotary shaft 20 along a plane perpendicular to the axial direction AX is defined as a radial direction(s) RA, and the directions going around the rotary shaft 20 thereabout is defined as a circumferential direction(s) CR.

The stator 2 has different types of magnetic poles which are made up of permanent magnets and positioned alternately in the circumferential direction CR. The magnetic poles are plural in number for both types, and positioned on the outer circumferential surface so as to face the inner side of the stator 3. The number of magnetic poles of the rotor 2 will not be limited to the above, because such number depends on the types of electric rotary machines. In the present embodiment, eight magnetic poles (4 N-pole and 4 S-pole) are provided in the stator.

Figure 2:
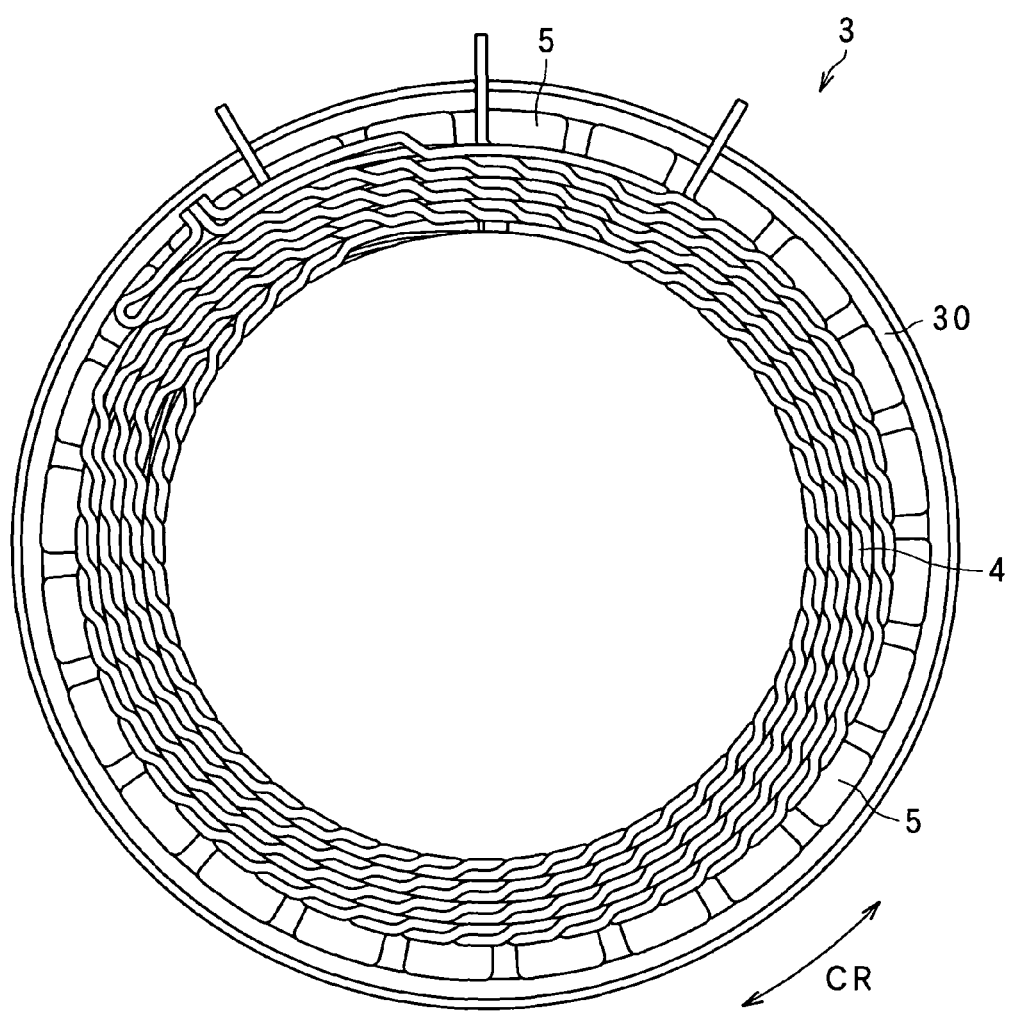
FIG. 2 is a plan view showing a stator assembled into the rotary electric machine.

As shown in FIG. 2, the stator 3 has a stator core 30, three-phase stator coil 4 composed of a plurality of phase winding wires wound at the stator, and insulating paper pieces 5 inserted between the stator core 30 and the stator coil 4.

Figure 3:
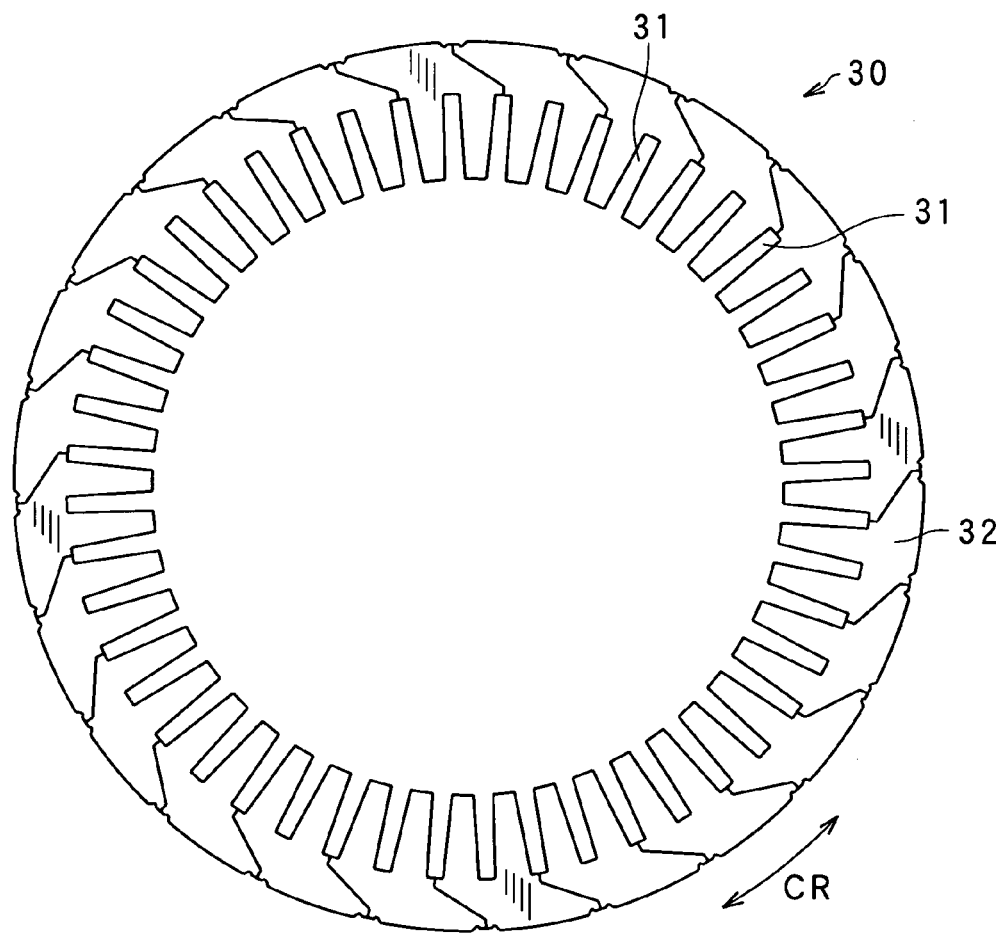
FIG. 3 is a plan view showing the stator core of the stator.

The stator core 30 has, as shown in FIG. 3, a ring body provided with a plurality of slots 31 opened from its inner surface to have openings and bottoms. The plurality of slots 31 are formed along its depth directions which agree with the radial directions RA. The number of slots 31 formed in the stator core 30 is set such that the number of magnetic poles of the rotor 2 is two per phase of the stator coil 4. In the present embodiment, a formula of 8×3×2=48 gives 48 pieces as the number of slots.

Figure 4:
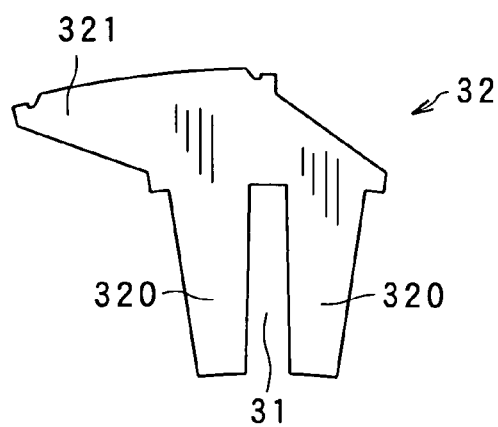
FIG. 4 is a plan view showing a single divided stacked core part which is composed into the stator core.

The stator core 30 is produced by mutually coupling a predetermined number of divided cores 32 (in the present embodiment, 24 pieces), shown in FIG. 4, so as to form the circumferential direction CR. Each of the divided cores 32, by itself, is shaped to have a single slot 31 and to lay out another slot 31 between each of two adjacent divided cores 32 coupled along the circumferential direction CR. Practically, each divided core 32 has a pair of teeth 320 extending inward in the radial direction RA and a back core 321 linking both teeth 320 at outward ends thereof in the radial direction RA.

Each of the divided cores 32 is made of a magnetic steel sheet having a thickness of 0.3 mm and, and 410 magnetic steel sheets are laminated on one another, with an electric insulating thin film inserted therebetween, so as to form the stator core 30. The stator core 30 is not limited to the use of the laminated divided cores 32 made of magnetic steel sheets, but may be used to a combination of conventionally known metal thin sheets and insulating thin films.

Figure 5A:
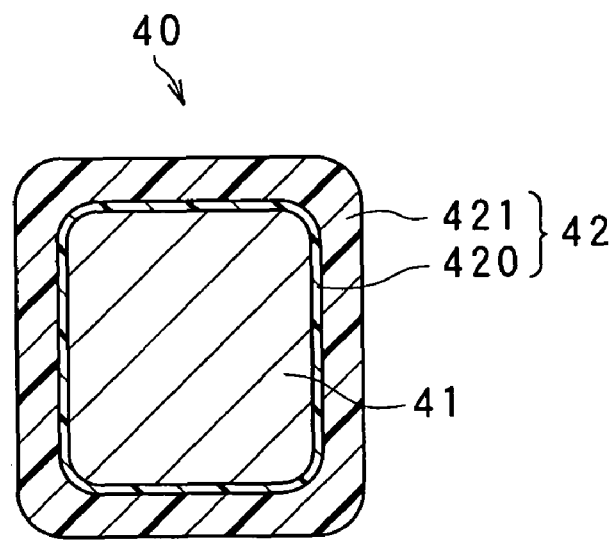
FIGS. 5A and 5B are sectional views of various types of winding wires which can be used as a stator coil.

The stator coil 4 is composed of a plurality of winding wires 40 wound based on a predetermined winding technique. Each winding wire 40, which composes the stator coil 4, is made up of a copper conductor 41 and electric insulating membrane 42 composed of inner and outer layers 420 and 421 covering the conductor 41 for electric insulation, as shown in FIG. 5A. The thickness of the insulating membrane 42, that is, the inner and outer layers 420 and 421, is set to 100-200 μm. Since the insulting membrane 42 is considerably thick, it is not necessary to insert an insulating member, such as insulating paper, into wound wires 40 for electric insulation. However, insulating paper may be inserted between the wound wires 40 and/or, as shown in FIG. 2, between the stator core 30 and the stator coil 40.

Figure 5B:
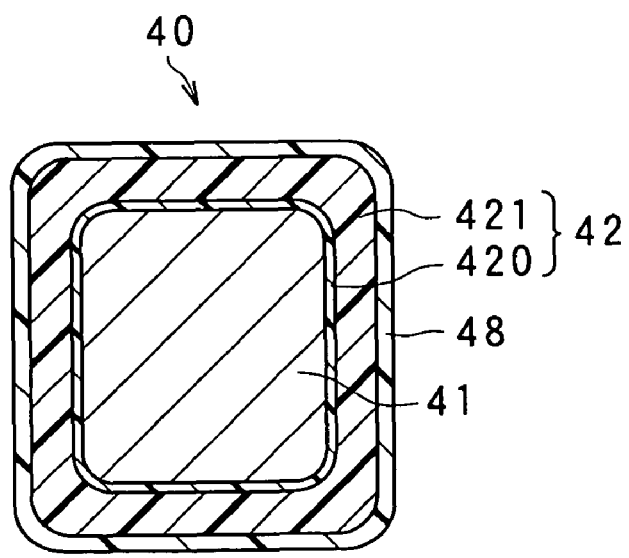

Meanwhile, as shown in FIG. 5B, the winding wires 40 for the stator coil 4 may be produced by applying fusion materials 48 to the insulating membrane 42 composed of the inner and outer layers 420 and 421. The fusion material 48 is made of materials such as epoxy resin. In this case, the heat generated in the rotary electric machine will cause the fusion material 48 to fuse faster than the insulating membrane 42, the plural wound wires 40 wound in the same slot 31 are subjected to thermal adhesion with the help of the fusion materials 48 applied to the wires 40. As a result, the plural wound wires 40 in the same slot 31 can be unified and hardened, thus improving the mechanical strength of the wound wires 40 in each of the slots 31.

Figure 6:
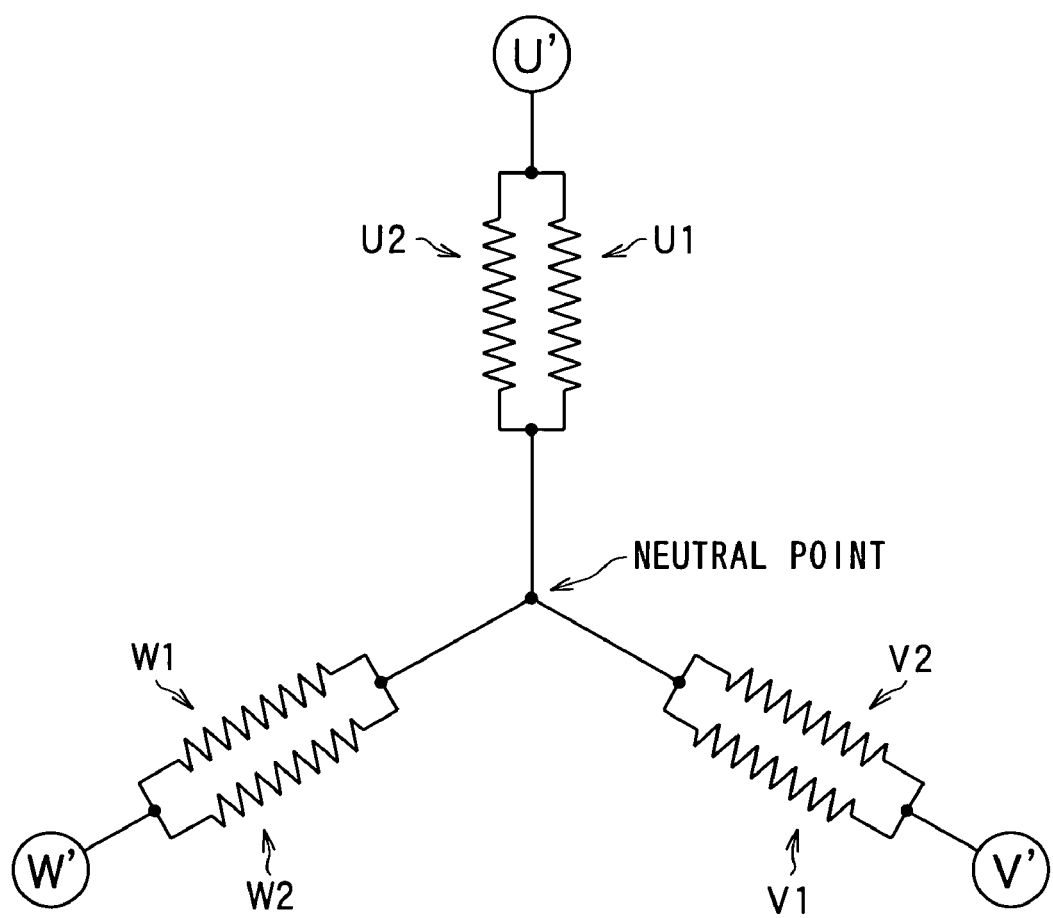
FIG. 6 is an electric diagram showing the connection of the stator coils.

As shown in FIG. 6, the stator coil 4 is composed of three-phase wound wires each composed of two wound wires, i.e., U1, U2; V1, V2; and W1, W2.

Figure 7:
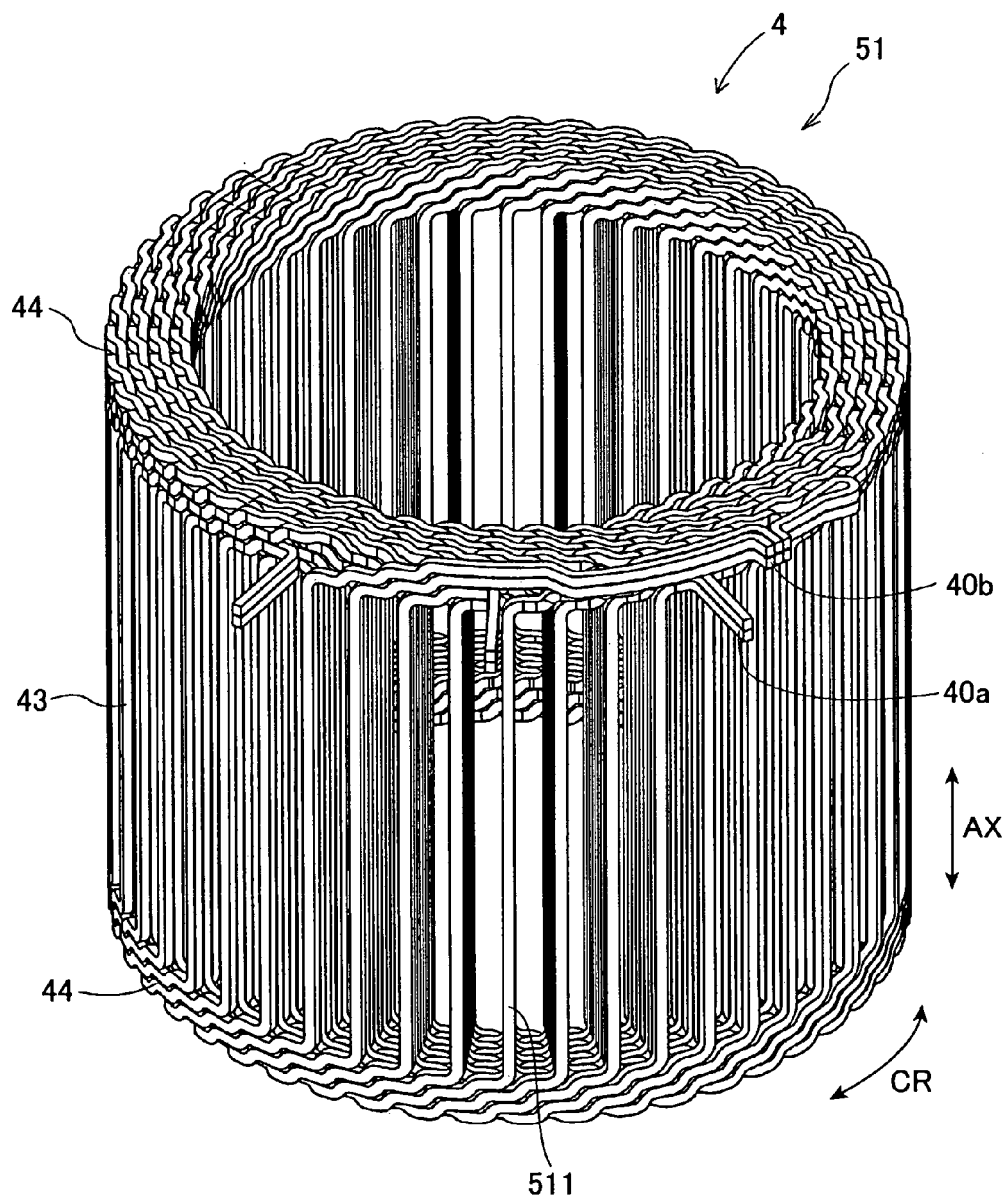
FIG. 7 is an oblique diagram showing a wound body which serves as the stator coil.

In addition, as shown in FIG. 7, the stator coil 4 is produced by winding the plural winding coils 40 in a predetermined shape. Practically the winding coils 40 are wound to provide a wave form in the circumferential direction CR on the inner circumferential side of the stator core 30.

Each of the winding wires 40, which compose the stator coil 4, includes linear slot accommodation portions 43 to be accommodated in the slots 31 of the stator core 30 (or slot-accommodation portions 43 when being accommodated in the slots) and coil end portions (or referred to as turn portions) 44 each connecting two mutually adjacent slot-accommodated portions 43. The slot-accommodated portions 43 are accommodated in the slots 31 every predetermined-number slots (in the present embodiment, 3 phases×2 wires/slot=6 slots). In detail, in FIG. 7, the slot-accommodated portions 43 of the stator coil 4 are produced to protrude, in a slight convex form, outward in the radial direction RA (refer to FIGS. 9 and 10), so that the inner surfaces of the slot-accommodated portions 43 are concaved in the radial direction RA. The turn portions 44 are arranged to protrude from the end faces of the stator core 30 in the axial direction AX.

The stator coil 4 is wound with both ends of the plural winding wires 40 made to protrude from the end faces of the stator core 30 in the axial direction AX, and the winding wires 40 are in wave forms along the circumferential direction CR. Each phase of the stator coil 4 is provided by mutually connecting, using welding, each of the ends of a first winding 40a and each of the ends of a second winding 40b. That is, each phase of the stator coil 4 is produced as one assembly by connecting both ends of one of two wire members to both ends of the other, end by end, which each of the two wire members is composed of an electric conducting wire. Each of the slot-accommodated portions 43 given by the first winding 40a and each of the slot-accommodated portions 43 given to the second winding 40b are accommodated in the same slot 31, wherein the slot-accommodated portions 43 of the first send second windings 40a and 40b are located alternately in the depth direction (i.e., in the radial direction RA). The first and second windings 40a and 40b are mutually connected by connected portions 45, in each phase, at each of which the winding directions between the first and second windings 40a and 40b are reversed. The connected portions 45, which are also provided as slot-accommodated portions 43, are formed as return portions 46.

A development view of the stator 4, a plan view of an integrated body 47 before winding, is shown in FIG. 8, in which the stator coil 4 comprises six sets of coil assemblies each consisting of the first winding 40a and the second winding 40b which are respectively wound in the mutually opposite directions. Using these six sets of coil assemblies, the coils for three phases (U, V, W)×2 pieces (double slots) are provided. In each set of coil assembly, the neutral-point-side end (or the phase-terminal side end) and the other end which is the opposite thereto of the first winding 40a are connected, respectively, to the neutral-point-side end (or the phase-terminal side end) and the other end which is the opposite thereto of the second winding 40b via the specified ones of the slot-accommodated portions 43, which specified ones serve as the return portions 46. How to connect the winding wires 40 for each phase is the same.

Hereinafter, the method of manufacturing the stator 3 according to the first embodiment will now be described. The stator 3 is manufactured using the following steps. In the following, when a core member of the wound body is described separately, the radial direction means a radial direction assigned to the core member or the wound body, the circumferential direction means a circumferential direction assigned to the core member or the wound body, and the axial direction means an axial direction assigned to the core member or the wound body. Meanwhile, when the stator coil is assembled with the stator core 30 and the assembly work is completed, the radial, circumferential and axial directions agree with the foregoing radial, circumferential and axial directions RA, CR and AX. Hence, the reference labels for the directions are given as RA, CR and AX in both cases.

(Step for Forming Stator Coil)

At first, twelve electric conductive wires are used to form twelve shaped coil members. Each of the shaped coil members comprises a plurality of linear portions (slot-accommodated portions) 431 extending in parallel with each other and directed in the longitudinal direction of the shaped wire members and a plurality of turn portions (coil end portions) 441 each connecting two mutually adjacent linear portions 432 at one ends thereof and the other ends thereof in an alternate manner.

(Step for Integrating Stator Coil)

Integrating the twelve shaped coil members produces an integrated body 47, in which six integrated winding members are directed in parallel in the longitudinal direction of the integrated body 47. Each integrated winding member is composed of a first wire portion providing the first winding 40a and a second wire portion providing the second winding 40b. The first wire portion is composed of one shaped wire member and the second wire portion is also composed of one shaped wire member. In each integrated winding member, ends of the first and second wire portions are mutually welded to be connected, thus providing the connected portion 45. Alternatively, after integrating the twelve shaped wire members into the integrated body, the one ends of the first and second wire portions may be connected to each other in each integrated body. Still alternatively, the one ends of the first and second wire portions may first be connected to each other to produce six sets of integrated winding members, and the six sets of integrated winding members are then subjected to integration work.

Each integrated winding member in the integrated body 47 has a plurality of linearly superposed portions 471 directed along the longitudinal direction of the integrated body 47. The linearly superposed portions 471 are composed of the plural linear portions 431 of the first wire portion and the plural linear portions 431 of the second wire portion, which wire portions are stacked on one another. In this way, the integrated body 47 is produced by integrating the plural shaped wire members into a strip-like form.

(Step for Reeling Stator Coil)

Figure 9A:
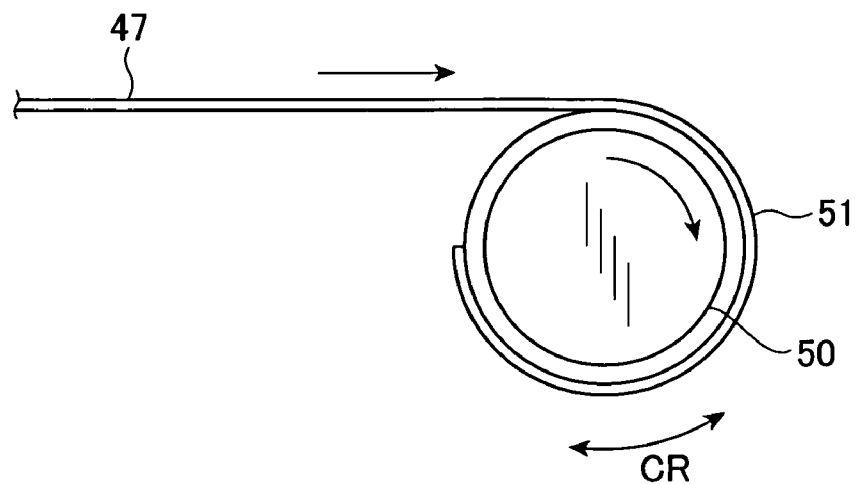
FIGS. 9A and 9B each illustrate a winding-up step for winding up the stator coil.
Figure 9B:
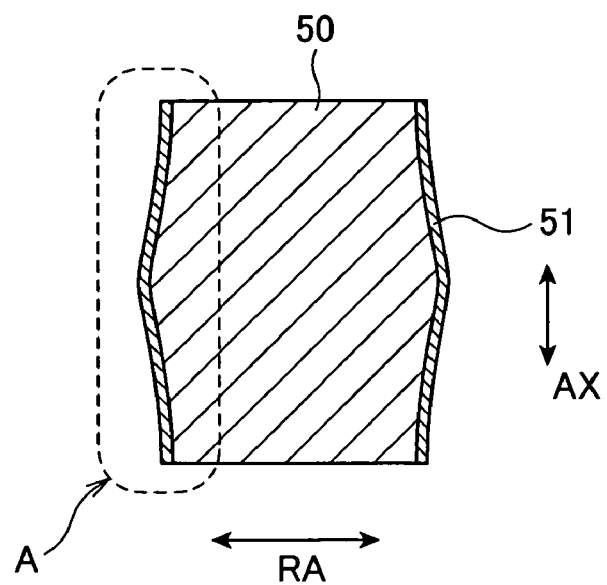
Figure 10A:
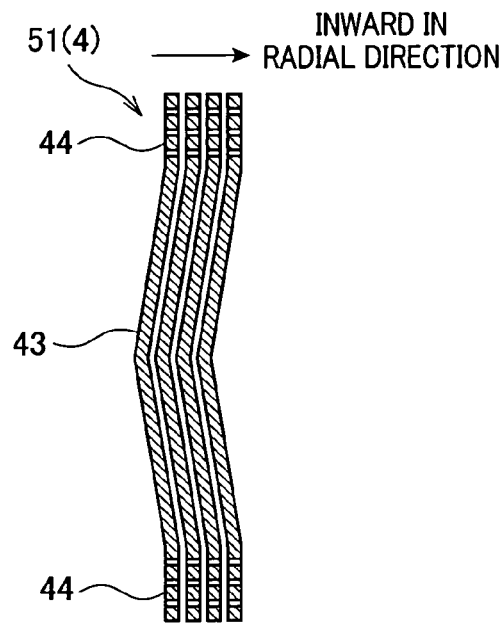
FIGS. 10A and 10B each show an enlarged sectional view of the wound body (stator coil)

Referring to FIGS. 9A, 9B and 10A, a reeling step will now be described.

FIG. 9A is a view showing the core member 50 in the axial direction AX and FIG. 9B is a sectional view taken along the axial direction of the core member 50. FIG. 10A is an enlarged view of a part encircled by a reference A in FIG. 9B, the view showing a wound body 51.

As shown in FIGS. 9A and 9B, the sectional shape along the radial direction RA of the core member 50 is circular and the outer circumferential surface of the core member 50 is bent in a dogleg shape when viewed along the axial direction. The core member 50 has the outer circumferential surface formed to protrude outward in the radial direction RA such that the amount of protrusion becomes larger when going from both ends to a central part in the axial direction AX. This core member 50 is used to reel the strip-shaped integrated body 47 on its outer circumferential surface such that one longitudinal end of the integrated body 47, specifically, the return portion, is first wound up. The remaining part of the integrated body 47 is then reeled to complete the reeling work, so that the whole integrated body 47 is wound up on the outer circumferential surface of the core member 50, thus providing the wound body 51. This wound body 51 provides the stator coil 4. In the present embodiment, the wound body 51 is composed of the wound-up integrated body of four turns.

The central part of the outer circumferential surface of the core member 50 is protruded outward more than both ends in the axial direction AX. For this reason, the portions 43 being accommodated in the slots of the wound body 51 (i.e., stator coil 4) is shaped as shown in FIG. 10A, where the portions 43 has a convex (i.e., a dogleg shape) protruding outward in the radial direction RA. The slot accommodation portions 43 of the wound body 51 have thus a central part which is most protruded in the axial direction AX. Hence, the inside of the slot accommodation portions 43 in the radial direction RA is concaved. In the slots 31 of the stator core 30, the protruded surfaces of the slot accommodation portions 43 are directed toward the opposite way to the opening of each slot 31. In addition, the protruded portions of the slot accommodation portions 43 are plastic-deformed. This wound body 51 has a plurality of linear stacked portions 511 in the circumferential direction CR of the wound body 51. The linear stacked portions 511 are formed, where the plurality of linear superposed portions 471 of one integrated winding member are stacked on one another in the radial direction RA. In each linear stacked portion 511, the plural linear portions 431, whose number is double the number of windings, are stacked one on another in a line along the radial direction RA (radial directions). The respective linear stacked portions 511 are spaced with a small gap therebetween in the circumferential direction CR of the wound body 51.

(Assembling Step)

The wound body 51 produced as above is then subjected to an assembling step, where the stator core 3 is assembled with the wound body 51 from the outside thereof in the radial direction RA. Practically, each of the teeth 320 of each of the divided cores 32 are inserted into the gap between mutually adjacent linear stacked portions 611 of the wound body 51 from outside the body 51 in the radial direction RA. Then, mutually adjacent divided cores among the divided cores 32 are linked to each other, providing the stator 3.

Figure 10B:
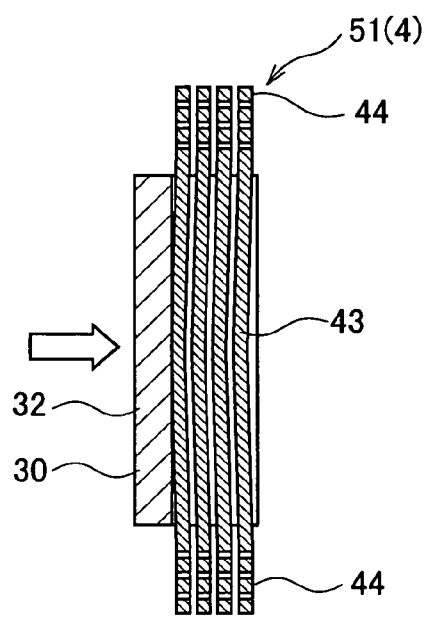

The slot-accommodated portions 43 of the wound body 51 (stator coil 4) are made to protrude outward in the radial direction RA. Hence, as shown in FIG. 10B, when the divided cores 32, which compose the stator core 30, are inserted from outside the slot-accommodated portions 43 of the stator coil 4, the convex parts of the slot-accommodated portions 43 are pressed inward in the radial direction RA (toward the slot opening side) by the slot bottoms of the divided cores 32. In response to this pressing, the convex parts of the slot-accommodated portions 43 are forced to deform inward in the radial direction RA, whereby the slot-accommodated portions 43 of the stator coil 4 becomes almost linear, which are nearly parallel to the axial direction AX. In this way, the stator 3 is manufactured.

As described above, manufacturing the stator 3 according to the present embodiment provides the following advantages.

The slot accommodation portions 43 of the stator coil 4 are given the convex parts before being inserted into the slots of the stator core 30. That is, during the step where the stator coil 4 is solely present as a cylindrical member, the slot accommodation portions 43 are formed to protrude outward in the radial direction, which is the opposite way to the openings of the slots into which the portions 43 are accommodated. In other words, the slot accommodation portions 43 are formed to be concave toward the slot openings. Therefore, when the slot accommodation portions 43 are accommodated in the slots, it is possible to prevent the slot-accommodated portions 43 from protruding, at least partly, from the openings of the slots of the stator core 30.

In forming the stator coil 4, even if the slot accommodation portions 43 of the stator coil 4 are bendable, the slot-accommodated portions 43 can be prevented from the openings of the slots by, at least, a clearance corresponding to the parts which are concave toward the slot openings. In addition, after forming the cylindrical stator coil 4, the stator core 30 is assembled with the stator coil. Thus, the stator core 30 is forced to press the slot-accommodated portions 43 of the stator coil 4 inward in the radial direction RA. That is, by the stator core 30, the convex parts of the slot-accommodated portions 43 are pressed inward in the radial direction RA. However, before being pressed by the stator core 30, the slot-accommodated portions 43 are given parts which are concave toward the openings of the slots, so that the pressure on the convex parts can be absorbed by the concave portion. Thus the slot-accommodated portions 43 can be prevented from protruding, at least partly, from the openings of the slots.

The convex parts of the slot-accommodated portions 43 are produced to protrude in the opposite radial direction to the openings of the slots of the stator core 30 in such a manner that the central part of each slot-accommodated portion 43 in the axial direction AX is the highest in protrusion height. Both ends of each slot-accommodated portion 43 continue to coil end portions 44 in the axial direction AX, respectively. Accordingly the axially central parts of the slot-accommodated portions 43 are easier to deform compared to axial both ends thereof. The easily-deformable axial central parts are protruded more than the remaining parts in the opposite way to the slot openings in the radial direction RA. It is therefore possible to reliably prevent the slot-accommodated portions 43 from protruding from the slot openings of the stator core 30.

Moreover, the convex parts of the slot-accommodated portions 43 are produced by plastic deformation. This plastic deformation gives work hardening to the convex parts. With the aid of this work hardening, the amount of deformation of the slot-accommodated portions 43 toward the slot openings can be limited, even when the convex parts are pressed by the stator core 30 inward in the radial direction RA. Hence, the slot-accommodated portions 43 can be prevented from protruding, at least partly, from the slot openings, without fail. If the slot-accommodated portions 43 are forced to vibrate during use of the present rotary electric machine, the work hardening given to the convex parts can allow the slot-accommodated portions 43 to fall out from the slot openings.

Second Embodiment

Figure 11A:
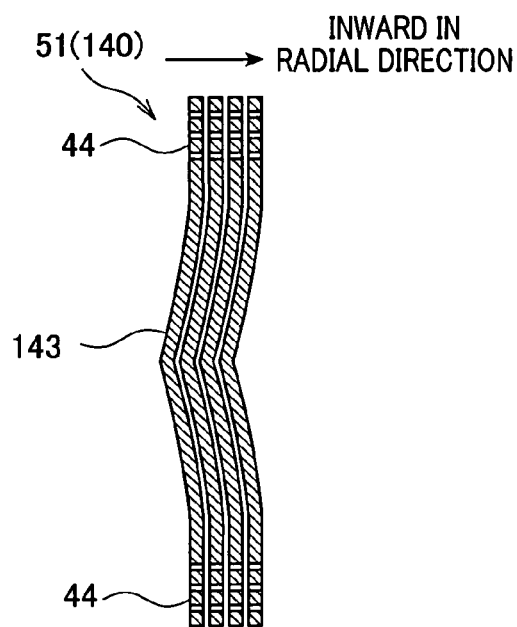
FIGS. 11A and 11B each show an enlarged sectional view of the wound body (stator coil)
Figure 11B:
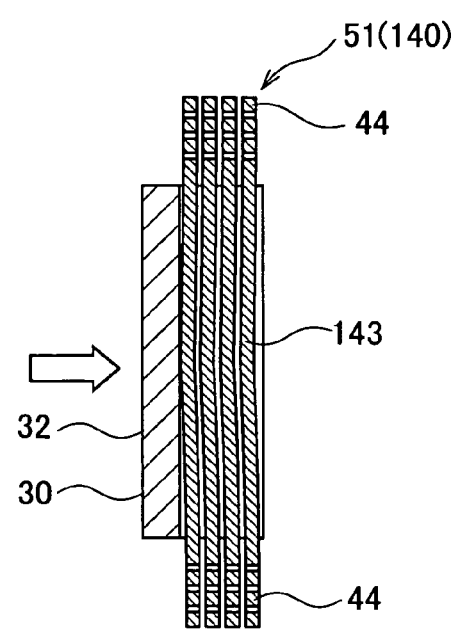

Referring to FIGS. 11A and 11B, a stator 3 according to the second embodiment will now be described. In the present and subsequent embodiments, the components identical or similar to those described in the first embodiment are given the same reference numerals for the sake of simplified or omitted description.

The stator 3 according to the second embodiment differs from that in the previous embodiment in the shape of a stator coil 140 provided in the state prior to being assembled with the stator core 30. As shown in FIG. 11A, where the stator coil 140 provided with slot accommodation portions 143 and coil end portions 44 is provided. Each of the slot accommodation portions 143 has a connection portion integrally formed with one of both coil end portions 44 and the connection portion is formed to have a tangent line which is substantially parallel to the axial line AX of the stator coil 4. In other words, each slot accommodation portion 143 is gradually bent from both axial ends of the portion 143 to the axial central part thereof.

Assembling the stator core 30 with the stator coil 4 produced in this way will provide the configuration shown in FIG. 11B. Since both axial ends of each of the slot-accommodated portions 143 continues to each of the coil end portions 44, both axial ends will resist deformation when being pressed by the stator core 30. Hence, both axial ends of each of the slot-accommodated portions 143 can easily be accommodated into the slots of the stator core 30.

Third Embodiment

Figure 12A:
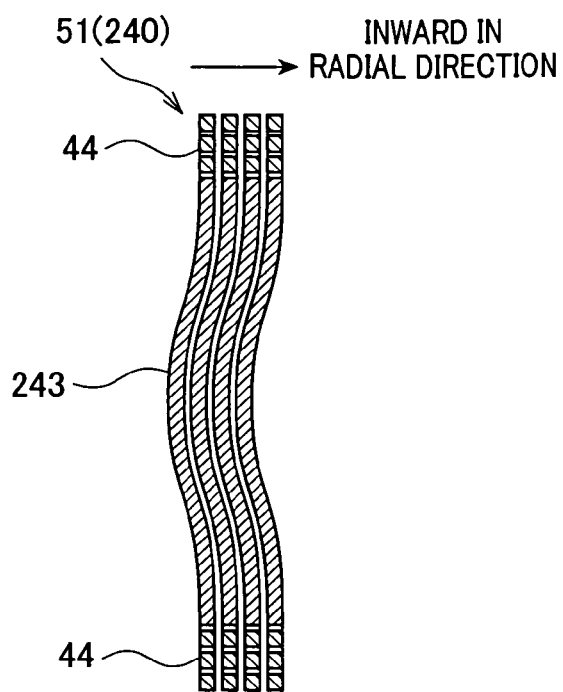
FIGS. 12A and 12B each show an enlarged sectional view of the wound body (stator coil).
Figure 12B:
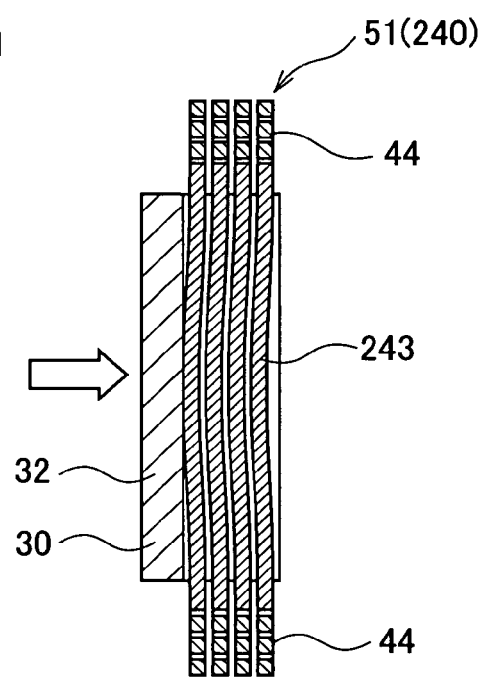

Referring to FIGS. 12A and 12B, a stator 3 according to the third embodiment will now be described.

The stator 3 according to the third embodiment differs from that in the previous embodiments in the shape of a stator coil 240 provided in the state prior to being assembled with the stator core 30. The stator coils 4 and 140 explained in the first and second embodiments are given the axial central parts each having a pointed top. In contrast, in the present embodiment, as shown in FIG. 12A, a stator coil 240 has stator coils 240 given slot accommodation portions 243 and each of the slot accommodation portions 243 is bent in the same way as the foregoing, but to have a smoothly bent round top. That is, the whole segment of each of the slot accommodation portions 243 is curved. As a result, as shown in FIG. 12B, when the slot-accommodated portions 243 are pressed by the stator core 30, a substantial area contact can be achieved between the stator core 30 and the slot-accommodated portions 243. Accordingly, this area contact makes it possible to prevent the film of the slot-accommodated portions 243 from peeling.

In the foregoing embodiments, the stator core 30 has been combined, i.e., assembled with the stator coil 4 by inserting the stator core 30 from outside the stator coil 4 in the radial direction RA, but this is not only the example. The stator core 30 may be inserted into the stator coil 4 from the inner side, but outside, of the stator coil, in the radial direction RA. In this case, the slot openings are formed in the stator to open outward in the radial direction RA and the slot accommodation portions 43 of the stator coil 4 are given convex parts protruding inward in the radial direction RA.

The configurations described in the foregoing embodiments are just examples, and the rotary electric machine and the manufacturing method according to the present invention will not be confined to only such examples. The rotary electric machine and the manufacturing method according to the present invention may be practiced into a variety of modes to which alternations and/or improvements are added which can be conducted by those skilled in the art, without departing from the gist of the present invention.

What is claimed is:
1. A stator for rotary electric machines, comprising:
a stator core having a radial direction and having slots provided with bottomed openings directed inward or outward in the radial direction; and
a stator coil comprising slot accommodation portions being accommodated in the slots of the stator core and coil end portions each connecting mutually adjacent slot accommodation portions among the slot accommodation portions and respectively protruding from both end faces of the stator core, wherein the stator coil is pre-formed into a cylindrical shape before the slot accommodation portions are accommodated into the slots of the stator core, the slot accommodation portions are formed to respectively have convex parts each protruding toward an opposite way to the openings of the slots, before the slot accommodation portions are accommodated into the slots, and the convex parts are pressed by the stator core toward the openings during accommodation of the slot accommodation portions into the slots.

2. The stator for rotary electric machines according to claim 1, wherein the stator core has an axial direction perpendicular to the radial direction and each of the convex parts is formed as an axial central part of each of the slot accommodation portions, the axial central part protruding more than a remaining part of each slot accommodation portion toward the opposite way to the openings in the radial direction.

3. The stator for rotary electric machines according to claim 2, wherein each of the slot accommodation portions has an axial sectional shape of being dogleg, before the slot accommodation portions are accommodated into the slots.

4. The stator for rotary electric machines according to claim 3, wherein each of the slot accommodation portions has connection parts integrally formed with specified coil end portions among the coil end portions, the connection parts having tangent lines which are nearly parallel to the axial direction, before the slot accommodation portions are accommodated into the slots.

5. The stator for rotary electric machines according to claim 4, wherein the convex parts are formed by plastic deformation.

6. A method of manufacturing the stator as set forth in claim 1, the method comprising steps of:

forming a plurality of shaped coil members from electric conductive wires;

integrating the plurality of shaped coil members into a strip-like integrated body;

reeling the integrated body around an outer circumferential surface of a core member to produced the stator coil of a cylindrical form, wherein the slot accommodation portions are formed to respectively have convex parts each protruding toward an opposite way to the openings of the slots, before the slot accommodation portions are accommodated into the slots; and assembling the stator core with the stator coil so that the slot accommodation portions of the stator coil are accommodated into the slots of the stator core, wherein the convex parts are pressed by the stator core toward the openings during accommodation of the slot accommodation portions into the slots.

7. The manufacturing method according to claim 6, wherein the stator core is formed to have an axial direction perpendicular to the radial direction and each of the convex parts is formed as an axial central part of each of the slot accommodation portions, the axial central part protruding more than a remaining part of each slot accommodation portion toward the opposite way to the openings in the radial direction.

8. The manufacturing method according to claim 7, wherein each of the slot accommodation portions is formed to have an axial sectional shape of being dogleg, before the slot accommodation portions are accommodated into the slots.

9. The manufacturing method according to claim 8, wherein each of the slot accommodation portions is formed to have connection parts integrally formed with specified coil end portions among the coil end portions, the connection parts having tangent lines which are nearly parallel to the axial direction, before the slot accommodation portions are accommodated into the slots.

10. The manufacturing method according to claim 9, wherein the convex parts are formed by plastic deformation.

* * * * *